United States Patent [19]
Horn

[11] Patent Number: 6,039,373
[45] Date of Patent: Mar. 21, 2000

[54] DEVICE FOR LIFTING AND HANDLING FOWL OR MEAT

[76] Inventor: Lois Horn, 33 Old Field Hill Rd., Southbury, Conn. 06488

[21] Appl. No.: 08/989,718

[22] Filed: Dec. 12, 1997

[51] Int. Cl.[7] ...................................................... B65G 7/12
[52] U.S. Cl. ................................ 294/15; 294/26; 294/61
[58] Field of Search ............................... 294/15, 26, 27.1, 294/32, 55.5, 61, 62, 92, 120, 137, 158; 99/421 A, 426, 427, 442

[56] References Cited

U.S. PATENT DOCUMENTS

| | | | |
|---|---|---|---|
| 287,727 | 10/1883 | Ross | 294/15 |
| D. 319,949 | 9/1991 | Pollack | D7/683 |
| 1,448,999 | 3/1923 | Haarberg | 294/15 |
| 2,575,794 | 11/1951 | Chauncey | 294/55.5 |
| 2,587,133 | 2/1952 | Finizie | 294/55.5 |
| 2,905,502 | 9/1959 | Brown | 294/92 |
| 3,006,679 | 10/1961 | Gray | 294/92 |
| 3,812,776 | 5/1974 | Kean . | |
| 3,980,010 | 9/1976 | Collinucci . | |
| 4,429,625 | 2/1984 | Nelson . | |
| 4,446,777 | 5/1984 | Grigorenko . | |
| 4,648,379 | 3/1987 | Fordyce . | |
| 4,831,690 | 5/1989 | Foegen | 294/15 |
| 5,005,257 | 4/1991 | Bailey | 294/26 |
| 5,158,009 | 10/1992 | Stewart . | |
| 5,238,445 | 8/1993 | Green . | |
| 5,339,555 | 8/1994 | Miskimins | 294/26 |
| 5,388,878 | 2/1995 | Smith | 294/15 |
| 5,628,244 | 5/1997 | Holliday . | |

OTHER PUBLICATIONS

Photocopy of instrument found at Housewares Show, Apr. 1998.

*Primary Examiner*—Dean Kramer
*Attorney, Agent, or Firm*—Ohlandt, Greeley, Ruggiero & Perle

[57] ABSTRACT

A device for facilitating the lifting and handling of a fowl or body of meat, comprising an elongated upper shaft having a proximal end with a handle, an elongated lower shaft spaced from and below the upper shaft for insertion into the fowl or body of meat, and a shaft for connecting the upper and lower shafts, the lower shaft having a distal end portion which includes a meat contact located below the handle for contacting an internal portion of the fowl or body of meat approximately at or distally beyond its center of gravity. The meat contact can be or include a fixation point for fixing the meat contact to the fowl or body of meat to prevent movement of the same off of the meat contact during lifting and handling.

12 Claims, 3 Drawing Sheets

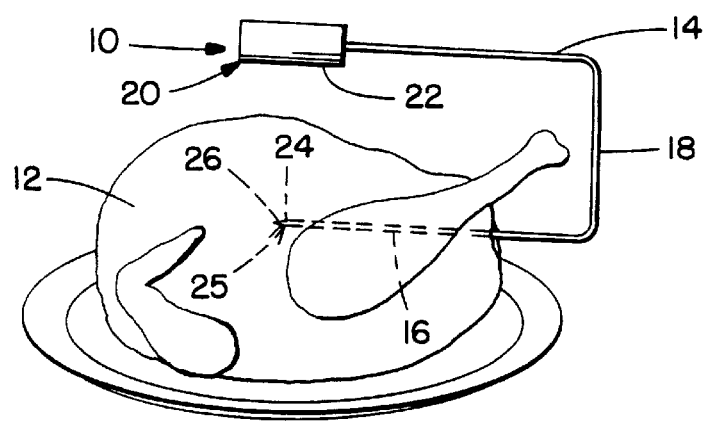
FIG. 1.
FIG. 2.
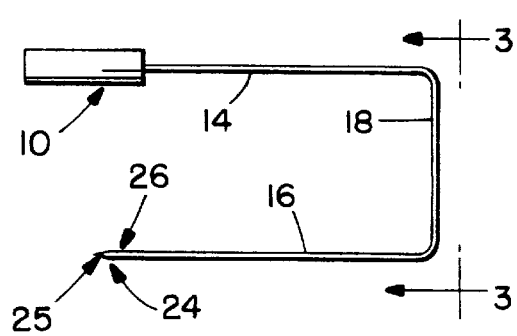
FIG. 5.
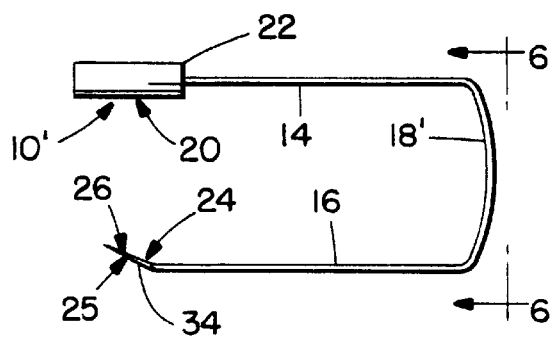
FIG. 3.
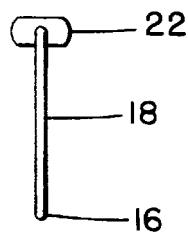
FIG. 6.
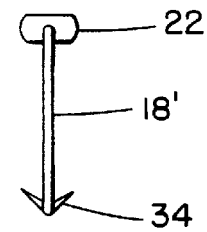
FIG. 4.
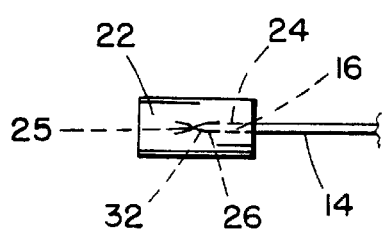
FIG. 7.
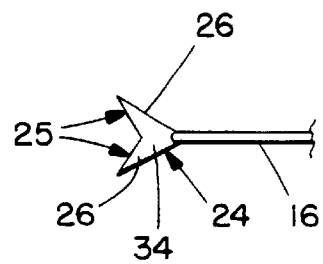

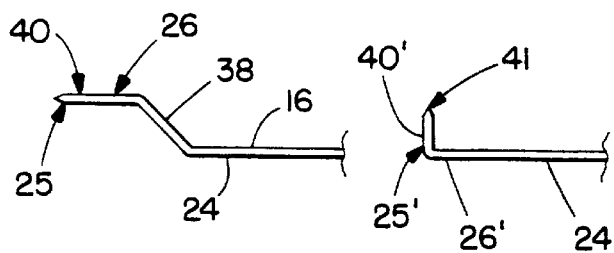
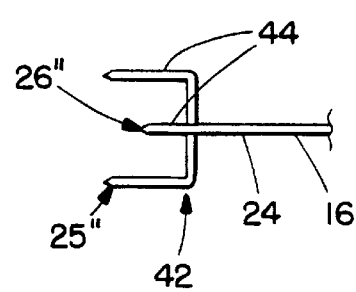
FIG. 8. FIG. 9. FIG. 10.
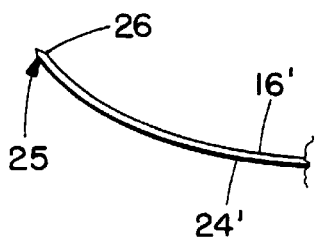
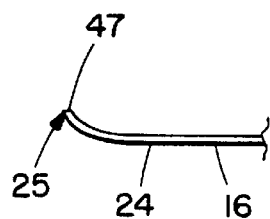
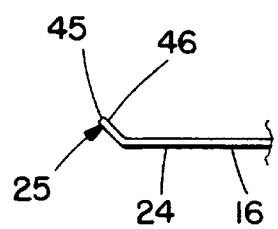
FIG. 11. FIG. 12. FIG. 13.
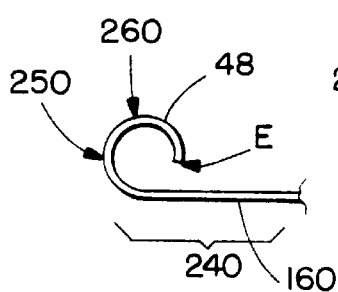
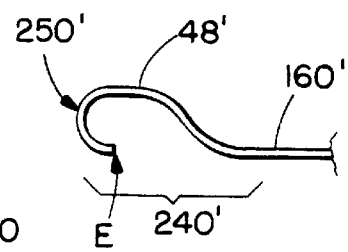
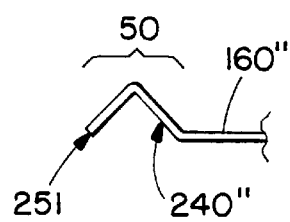
FIG. 14. FIG. 15. FIG. 16.
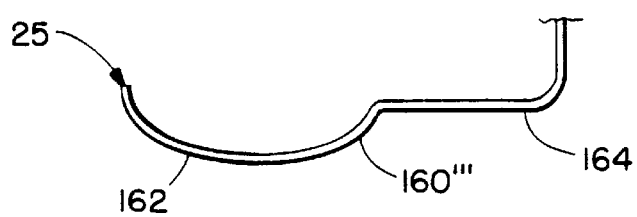
FIG. 17.

DEVICE FOR LIFTING AND HANDLING FOWL OR MEAT

FIELD OF THE INVENTION

This invention relates to devices for the lifting and handling of fowl and bodies of meat. More particularly, this invention relates to devices which can be used, for example, in the home to facilitate the lifting and handling of fowl such as turkeys and meat such as roasts.

BACKGROUND OF THE INVENTION

Fowl such as turkeys, chickens, ducks and geese, and bodies of meat such as roasts of beef, lamb or pork are difficult to lift and manipulate, particularly when they are hot, in pans which include hot juices and in ovens or other cooking environments. The bodies of fowl and of meat are often heavy and bulky, and their weight often is not uniformly distributed. Further, when hot and on an underlying support, such as a hot pan, the hot pan must be handled with insulated, often cumbersome gloves. The pans can be difficult to lift and handle because they may be relatively wide and long, and they usually have narrow rims or flanges which are difficult to grasp. Particularly when hot and supporting a hot body of fowl or meat, the pans require significant care in handling and maneuvering since they contain hot, slippery juices, and if the pan is tipped, the fowl or meat can slip, be dropped or cause messy spills and burns.

Heretofore, there has not been a satisfactory device for lifting and handling a fowl or body of meat, directly, easily and with balance, particularly with one hand.

SUMMARY OF THE INVENTION

It is an object of this invention to provide a device which overcomes one or more of the above difficulties and facilitates the lifting and handling of fowl and bodies of meat, for example, for lifting them from their cooking pans or supports, and for transporting them to and depositing them on serving trays, platters or cutting boards.

Another object of this invention is to provide such an aforementioned device which permits lifting and handling of even the heaviest of fowl and bodies of meat directly, easily, and with one hand.

Another object of the invention is to provide such an aforementioned device which permits lifting and handling of fowl and bodies of meat with substantial balance of the fowl or body of meat on the device.

Yet another object of this invention is to provide an aforementioned device which makes it easy to transport with one hand a fowl or body of meat without dropping it from the device.

Still another object is to provide an aforementioned device which minimizes slippage of the carried fowl or body of meat on or rotationally about the device, thereby minimizing strain imparted to the user, for example, by minimizing twisting or turning forces imparted to the user's wrist or arm.

Still another object of this invention is to provide an aforementioned device which permits easy decanting of juices from a fowl carried on the device, without slippage of the fowl from the device.

The above and other objects and advantages are provided by a device of this invention for facilitating the lifting and handling of a fowl or body of meat, which comprises an elongated upper member having grasping means, an elongated lower member spaced from the upper member for insertion into and supporting the fowl or body of meat, the lower member having contact means located below or directly below the grasping means for contacting an internal portion of the fowl or body of meat, and connecting means removed from the grasping means of the upper member and removed from the contact means of the lower member, for connecting the upper and lower members. The lower member has a length such that the contact means can be inserted into the fowl or body of meat at least to a position near its center of gravity.

A device for facilitating the lifting and handling of a fowl or body of meat is provided which can comprise an elongated upper shaft having a proximal end and a remote end, the proximal end including grasping means, an elongated lower shaft for insertion into and for supporting the fowl or body of meat, the lower shaft having a distal end portion and a remote end, the distal end portion including contact means located directly below the grasping means of the upper shaft, for contacting an internal portion of the fowl or body of meat, approximately at, near or distally beyond its center of gravity, and connecting means for connecting the remote ends of the shafts, the lower shaft being spaced from and below the upper shaft such that upon insertion of the lower shaft into the fowl or body of meat, lifting force imparted to the grasping means brigs the contact means into contact with an internal portion of the fowl or body of meat which is directly below the grasping means.

The grasping means can extend along the longitudinal axis of the upper shaft. The contact means of the lower shaft preferably is positioned directly below the axial and/or lateral center of the grasping means, more preferably directly below each center, and preferably the contact means is positioned at or distally beyond the axial center of the grasping means. The distal end portion of the lower shaft can include a distal end, and the contact means of the lower shaft can be positioned at the distal end. The contact means of the lower shaft can include fixation means, such as an upwardly directed fixation point, for fixing the contact means to the fowl or body of meat to prevent movement of the same off of the fixation means during lifting and handling. The contact means can be elevated from adjacent portions of the lower shaft, it can include a support surface which is in a plane parallel to a plane through the grasping means, and preferably it is spaced at least 3 inches below the grasping means. The distal end portion of the lower shaft can be disposed in an upward direction toward a horizontal plane through and beyond a portion of the upper shaft.

The device can include means for stabilizing the fowl or body of meat against rotating about the lower shaft, and the connecting means and/or the contact means can include the stabilizing means. The connecting means can be integral with and vertically aligned with the upper and lower shafts. The device can be substantially U-shaped, and can have a lower shaft which is at least 3 inches long.

The foregoing and other objects, advantages and features of the invention will become apparent from the following description and claims, read in conjunction with the accompanying drawings, in which like reference numerals designate basically the same elements.

BRIEF DESCRIPTION OF THE DRAWINGS

FIG. 1 is a perspective view of the device of this invention in use with a turkey.

FIG. 2 is a side elevational view of the device shown in FIG. 1.

FIG. 3 is an end view of the device as would be seen along line 3—3 of FIG. 2.

FIG. 4 is a top view, with portions broken away, of the proximal end of the upper shaft of the device of FIG. 1.

FIG. 5 is a side elevational view of another embodiment of the device of the invention.

FIG. 6 is an end view of the device as would be seen along line 6—6 of FIG. 5.

FIG. 7 is a top view, with portions broken away, of the distal end portion of the lower shaft of FIG. 5.

FIGS. 8–16 are side elevational views or top plan views, with portions broken away, of embodiments of distal end portions of lower shafts of the device of this invention.

FIG. 17 is a side elevational view, with portions broken away, of an embodiment of the lower shaft of a device of this invention.

DETAILED DESCRIPTION OF THE INVENTION

Figure 18:
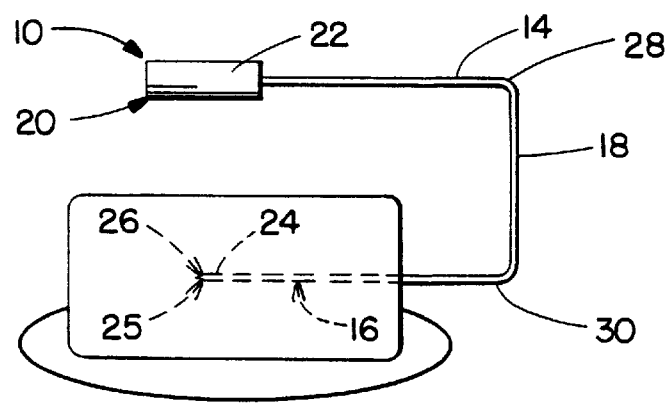
FIG. 18 is a perspective view of the device of this invention in use with a body of meat.

FIG. 1 shows a preferred embodiment of the device of this invention, generally designated 10, for facilitating the lifting and handling of a fowl or body of meat, here shown as the body 12 of a turkey. More particularly, FIG. 1 shows that device 10 is comprised of an elongated upper member, here shown as a shaft 14, an elongated lower member, here shown as a shaft 16, and connecting means, here shown as being or including shaft 18, for connecting the upper and lower shafts. Upper shaft 14 has a proximal end 20 (proximate the user) which includes grasping means, here shown as a handle 22.

Lower shaft 16 has a distal end portion, generally designated 24, located below, preferably directly below, the grasping means or handle 22, for insertion into body 12. Distal end portion 24 includes a distal end 25 which is the end of the lower shaft that is first inserted into body 12. Distal end 25 is the end of the lower shaft 16 that is farthest removed from proximal end 20 of the upper shaft, and which is most proximate the user. Distal end portion 24 is that portion of lower shaft 16 which is adjacent and upstream of distal end 25, and all or at least a portion of which is positioned physically below handle 22.

Lower shaft 16 is for insertion into and for supporting body 12. Lower shaft 16 includes contact means, generally designated 26, positioned below, preferably directly below, the grasping means or handle 22, for internally contacting and preferably also at least in part supporting body 12. Contact means 26 preferably is within distal end portion 24 of lower shaft 16. Lower shaft 16 is spaced from and below upper shaft 14, and preferably is adapted for insertion into body 12. Device 10 is adapted, and lower shaft 16 has a length, such that contact means 26 can be inserted into body 12 at least to a position near, and preferably approximately at or distally beyond its center of gravity. Device 10 is accordingly adapted such that lifting force imparted to handle 22 brings contact means 26 into contact with an internal portion of the fowl or body of meat which is directly below the grasping means. Connecting shaft 18 is removed from proximal end 20 of upper shaft 14 and from contact means 26 of lower shaft 16. Connecting shaft 18 preferably connects the remote end 28 of upper shaft 14 to the remote end 30 of lower shaft 16.

FIGS. 2 and 3 show that device 10 of FIG. 1 preferably is an integral shaft and is substantially U-shaped when viewed in side elevation. FIGS. 1 and 2 also show that connecting shaft 18 can have a central, intermediate portion which can be straight or substantially straight, and adjoining portions, which are arcuate, and which join or connect the central portion of connecting shaft 18 to upper and lower shafts 14, 16. Although not shown in FIG. 2, shaft 14 can extend into a portion of or into the entire length of or even beyond the proximal end of handle 22.

FIG. 3 shows that upper shaft 14 is preferably connected to handle 22 at the center of the end of the handle. FIG. 3 also shows that handle 22 is rectangular or oblong, connecting shaft 18 is vertically aligned with the longitudinal axis of the respective upper and lower shafts 14 and 16, and upper and lower shafts 14, 16 are vertically aligned along their lengths such that, as shown in FIG. 4, distal end 25 and contact means 26 of lower shaft 16 are directly under the center of handle 22.

FIG. 4 shows that upper and lower shafts preferably are parallel and longitudinally aligned directly under one another. FIG. 4 also shows that distal end 25 of lower shaft 16 preferably is a sharpened portion, surface or end, preferably in the shape of a point 32, and faces in the direction of insertion to facilitate insertion of the lower shaft into body 12. FIGS. 2, 3 and 4 show that handle 22 extends along the longitudinal axis of upper shaft 14, and that contact means 26 of lower shaft 16 preferably is directly below the axial center as well as the lateral center of handle 22.

FIGS. 5, 6 and 7 show another embodiment of the device of the invention, generally designated 10', wherein lower shaft 16 includes distal end portion 24, disposed in an upward direction at an angle toward a horizontal plane extending through and beyond handle 22. Although upwardly directed distal end portion 24 of shaft 16 could terminate in a single point (as shown in FIG. 4), FIGS. 6 and 7 show that in this embodiment, distal end portion 24 is shaped as a type of reversed arrowhead 34 having pointed distal ends 25. In FIGS. 5, 6 and 7, contact means 26 is within distal end portion 24 and includes the two distal ends 25 and an upper contact surface portion of distal end portion 24. It is understood that the direction of the arrowhead could be reversed to its normal direction so that its distal end would have a single point and the arrowhead would be joined to shaft 16 at or between the junction of distal ends 25.

Contact means 26 can be of any suitable construction, shape, dimension and/or configuration, and can face in any suitable direction(s) sufficient to achieve one or more of its functions. While not intending to exhaust all possible embodiments of suitable contact means, distal ends and distal end portions, FIGS. 8–16 show examples of the same. More particularly, FIG. 8 shows a side view of a lower shaft distal end portion 24 having an upwardly disposed section 38, and contact means in the form of planar support surface 40 which is above or elevated from an adjacent upstream portion of distal end portion 24 of lower shaft 16. Support surface 40 preferably is in a plane which is parallel to a horizontal plane drawn through handle 22. Support surface 40 is an example of contact means which function as a pivot which supports the fowl or body of meat below or directly below handle 22, without penetration of the interior cavity of body 12. If distal end 25 does not have a pointed end such as designated 32 in FIG. 4, a removable adapter (not shown), having a pointed end can be securely but removably mounted on distal end 25 and on a portion of distal end portion 24 of lower shaft 16.

Contact means 26 can be, include or provide, a pivot point or fixation means, such as a fixation point for fixing the contact means of the device to an internal portion of the fowl or body of meat to prevent movement of the same off of the fixation means or point during lifting and handling of the device with a fowl or body of meat thereon. The fixation means maintains the contact means in its position relative to the body's center of gravity and thereby facilitates lifting and handling body 12. Contact means in the form of fixation means also function as stabilizing means to help to stabilize and balance body 12 on the device and prevent body 12 from slipping along, from or relative to lower shaft when the device is lifted or handled, for example, when tipping body 12 forward during decanting of juices from the body. Thus, the contact means, e.g., as a fixation point, can also be, include or provide stabilizing means for stabilizing the body of fowl or meat from rotating or turning on or about the contact means or lower shaft.

In accordance with the above, FIGS. 9, 10, 11 and 13 show variations of contact means comprised of fixation means. More particularly, FIG. 9 shows a side elevation of a distal end portion 24 having a distal end 25', and contact means 26' comprising fixation means in the form of an upwardly directed member 40' having a top end in the form of a fixation point 41 which faces directly at handle 22. As discussed above, contact means 26", being a fixation point, also functions as stabilizing means.

FIG. 10 is a top view of contact means 26" in the form of a fork, generally designated 42 having a plurality of pointed prongs 44. Fork 42 comprises fixation means and stabilizing means as described above. Although fork 42 faces distally, it will be understood that fork 42 as well as contact means 26", distal end 25", distal end portion 24, and/or a portion of any of them, can face or point at any upward direction or angle, including acute, perpendicular or obtuse relative to a portion of lower shaft 16. For example, fork 42 can be disposed upwardly 90° relative to an adjacent planar or other portion of lower shaft 16, and relative to an overlying handle. This embodiment may be employed with a disemboweled fowl because the so disposed fork can be easily inserted into the cavity of the fowl, lifted and then moved downwardly out of contact with the fowl and easily withdrawn from the cavity.

FIG. 11 is a side view of a distal end portion 24' which is arcuately and upwardly shaped such that distal end 25 is elevated from an adjacent distal end portion 24' or other portion of shaft 16, and faces in an upward direction as in FIG. 5. Distal end 25 in FIG. 11 would function as contact means and as fixation means, particularly if pointed.

FIGS. 12 and 13 are side elevational views of additional embodiments of distal end portions of lower shafts wherein, in FIG. 12, distal end 25 has a point facing distally for facilitating insertion into a fowl or body of meat and has a planar upper support surface 47 for supporting body 12 thereon and providing a pivot therefor. FIG. 13 shows a distal end 25 having a point 45 facing distally in the direction of insertion of the lower shaft, and a point 46 facing upward to serve as a pivot or fixation point. It is understood that references herein to points, include other sharp configuration such as sharp edges suitable for adapting the contacting means, distal ends, distal end portions and/or stabilizing means of a lower shaft for the functions disclosed herein.

FIGS. 14, 15 and 16 are side elevational views showing further embodiments of the device of the invention, wherein in FIG. 14, a portion of distal end portion 240 is curled upwardly and downwardly back upon itself to provide contact means 260 in the form of an upwardly directed arcuate or spherically-shaped surface 48. FIG. 14 has a distal end 250 and exemplifies embodiments within the scope of this invention wherein the physical end E of lower shaft 160 is not considered to be the distal end of the shaft, and wherein distal end portion 240 of the lower shaft includes the contact means even though it is located on a portion of the lower shaft which is a continuation of the shaft beyond distal end 250.

FIG. 15 exemplifies another embodiment of distal end portion 240', wherein the physical end E of lower shaft 160' is not the distal end, distal end 250' is not part of the contact means, but distal end portion 240' includes contact means in the form of an upwardly facing arcuate surface 48' upstream of distal end 250'.

FIG. 16 shows a distal end portion 240" which includes contact means in the form of a peak 50. FIGS. 14, 15 and 16 exemplify embodiments of distal end portions wherein the contact means may be directly under handle 22, but distal end 251 of the lower shaft may be proximally beyond the proximal most end of and not below handle 22.

FIG. 17 shows that the lower shaft of the device of this invention need not be generally horizontal, but may include any shape consistent with the purposes of the invention. For example, lower shaft 160''' may have a downwardly arched intermediate portion 162 between distal end 25 and a remote portion 164 of the lower shaft, such that the intermediate portion does not support body 12 thereon, as does distal end 25 and remote portion 164.

FIG. 18 shows device 10 of FIGS. 1–4 in use with a body of meat such as a roast 120. Preferably, device 10 is adapted such as by a sharpened surface at distal end 25 to facilitate insertion into roast 120, and preferably it has stabilizing means (shown in FIG. 19) for stabilizing roast 120 from rotating about shaft 16.

Figure 19:
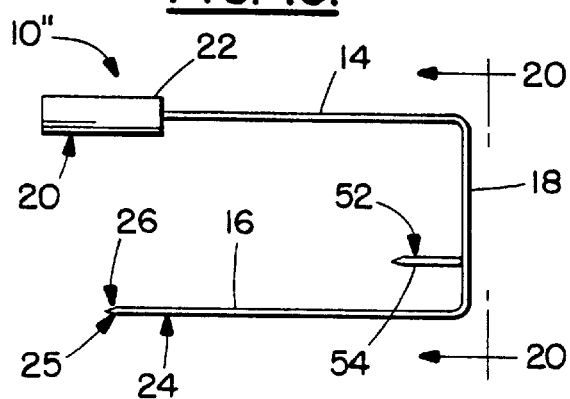
FIG. 19 is a side elevational view of another embodiment of the device of this invention.
Figure 20:
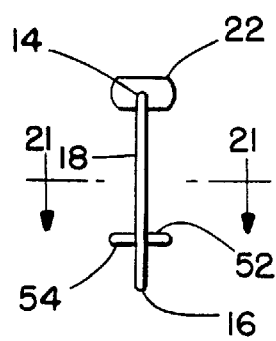
FIG. 20 is an end view as would be seen along line 20—20 of FIG. 19.
Figure 21:
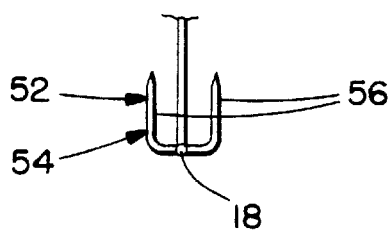
FIG. 21 is a top view as would be seen along line 21—21 of FIG. 20.

FIGS. 19, 20 and 21 show a device 10" having stabilizing means 52 in the form of a fork 54 mounted substantially rigidly onto connecting shaft 18 and extending in the direction of insertion of the lower shaft for insertion of fork 54 into roast 120 to stabilize it against rotational movement about shaft 18.

FIG. 20 shows that fork 52 is horizontally disposed, and FIG. 21 shows that fork 52 has a plurality of prongs 56. The stabilizing means employed on device 10 for use with roasts can be of any suitable size or construction and mounted onto the device at any suitable location.

The device of this invention preferably is made as an integral or substantially integral device. However, it can be comprised of separate components, e.g. a handle and one or more members or shafts, joined or connected by conventional methods and means, such as welding or the use of fasteners. The device can be made of any suitable material such as metals and polymers which, of course, must be sufficiently rigid to support and carry the fowl or body of meat with little if any flexing, bending or twisting. The materials must also withstand high cooking and sterilization or wash temperatures.

The preferred embodiment of the device is a one-piece, integral elongated shaft comprising an upper shaft with a handle, a lower shaft and a connecting shaft. The handle can be a separate component. The integral shaft preferably is made of an at least ¼ inch diameter stainless steel rod, and the handle is made of stainless steel tubing which, as shown in FIGS. 3, 6 and 20, is oval or oblong in shape, and preferably is disposed with the widest portion on the horizontal plane when viewed from the end or in vertical cross section. The tubing which forms the handle is about 4 inches long, about 1.5 inches wide across the horizontal width and about 1.0 inch in vertical thickness, again when the handle is disposed as shown in FIG. 3. It has been found that the handle should be at least about 3 inches long, preferably 3½ to about 4 inches long. The stabilizing means preferably are also made of stainless steel, have sufficient dimensions and strength for the purposes intended, and can be welded or fastened to the appropriate portion(s) of the device. The distal end portion of the device, including the contact means, preferably is forged, molded, or otherwise integrally formed, although it can be separately formed and connected to the lower shaft by a any suitable methods and means.

The upper, lower and connecting members of this invention can be of any suitable number, size, shape, dimension, cross section or configuration. For example, the upper member need not be a single shaft, since a plurality of shafts joined for example to one handle can also be employed. The upper member can be a wide sheet of material for added strength, or for shielding the user from splashing hot juices. Likewise, there can be plural connecting members, or the connecting member can, for example, be a solid, perforated or otherwise modified sheet of material of sufficient width for providing balanced lifting and transportation of fowl or bodies of meat. Such a wide sheet can be provided with features such as a catch area and a pouring spout for catching and decanting juices from a fowl. The lower member can likewise be comprised of any suitable number of one or more elongated members which can be of sufficient width to provide balance and stability to the carried fowl or bodies of meat. For example, the lower shaft for use with a fowl, can be a flat, or substantially flattened sheet of a width which will fit within the cavity of a disemboweled fowl, although for heavy carrying, the sheet may need supports or other rigidifcation.

It is within the scope of this invention to provide a device wherein there is a single upper member or shaft as described herein, and wherein there is one or more connecting members which connect(s) the upper shaft to multiple lower shafts, e.g. two spaced parallel lower shafts of equal length and whose contact means are below the upper shaft handle as described above, and are axially spaced equidistantly to either side of the longitudinal center and aligned with the axial center of the handle, or whose distal ends are joined under the such center of the handle such that the requisite balance is provided by the side-by-side pair of lower shafts.

The connecting means or member(s) can connect or join the upper and lower shafts at any suitable location on or along the upper and lower members. Thus, the connecting member(s) need not connect remote ends of the upper and lower shafts, so long as these shafts are connected or joined at locations sufficiently removed from the proximal end of the upper shaft and from the distal end or contact means of the lower shaft, such that the distal end of the lower shaft can be inserted without obstruction sufficiently into the fowl or body of meat as to position the contact means below or directly below the grasping means or the handle, and such that the axial extent or length of the upper and lower members is sufficient to span the fowl or body of meat. The connecting member can be vertically disposed with right or other angled or arcuate adjoining portions, or it can be a segment, e.g. an 180° segment, of a circle. Indeed, the device can comprise a substantially C-shaped embodiment wherein the upper, connecting and lower members are one large segment of a circle. Although the lower shaft provides the primary vertical support for the fowl or body of meat, certain configurations of adjoining portions of the connecting member can provide some support for the fowl or body of meat. When the device is tipped toward the connecting member, the adjoining portions and/or other upwardly disposed portions of the connecting member, provide a stop for and prevent the carried fowl or body of meat from falling off of the device.

The lower shaft should be at least about 3 inches, preferably at least about 3½ inches below the upper shaft, and the contact means should be at least about 3 inches below the handle of the upper shaft, for example when the contact means is elevated relative to adjacent portions of the lower shaft, and more preferably at least about 3½ inches below the handle.

It has been found that the distance from the contact means of the lower shaft, and hence from the axial center of the handle, to the extreme ends of the respective lower and upper shafts, that is, to the bend, angle or radius of the connecting means, should be at least about 7 inches.

It has also been found that for an angular distal end portion of the lower shaft, as shown in FIG. 5, the point of departure of the distal end portion from parallel to angular disposition should be about ½" upstream from a point below the axial center of the handle, and that the upwardly disposed portion of the distal end portion or of the contact means preferably is at an angle of about 30° relative to a horizontal portion of the lower shaft.

From the foregoing description, it can be seen that a main concept of the device of this invention is to provide lower shaft contact means preferably directly below the center of the upper shaft grasping means, and preferably at the center of gravity of the fowl or body of meat. Providing the handle, the contact means and the center of gravity of the fowl or body of meat basically vertically aligned, enables the lifting hand to impart lifting and handling force to and at the center of gravity of the fowl or body of meat, such that lifting with one hand is direct, easy and balanced, with minimum effort and twisting strain.

The device of this invention includes embodiments wherein the device, preferably the lower shaft, includes adapter means such as flexible or rigid pusher members and/or biasing members such as springs for providing and for moving contact means from say within a hollowed portion of the lower shaft, to a level above adjacent portions of the lower shaft.

This invention includes devices whose lower shaft is adapted to provide expandable and retractable stabilizing means, such that the distal end of the shaft can be inserted into the fowl or body of meat with the stabilizing means inactive or retracted. Once inserted, the stabilizing means, for example, prongs, can expanded or activated outward.

Having thus described the device of this invention with particular reference to preferred embodiments thereof, it will be apparent that various changes and modifications may be made therein without departing from the spirit and scope of the present invention as defined in the appended claims.

What is claimed is:

1. A device for facilitating the lifting and handling of a fowl or body of meat, which comprises:
    an elongated upper shaft having a proximal end and a remote end, the proximal end including grasping means,
    an elongated lower shaft for insertion into and for supporting the fowl or body of meat, the lower shaft having a distal end portion and a remote end, the distal end portion being located below and parallel to the grasping means, the distal end portion including contact means located directly below a center of gravity of the grasping means of the upper shaft when contacting an internal portion of the fowl or body of meat, connecting means for connecting the remote ends of the shafts, the lower shaft being spaced from and below the upper shaft such that upon insertion of the lower shaft into the fowl or body of meat, a lifting force imparted to the grasping means brings the contact means into contact with an internal portion of the fowl or body of meat which is directly below the center of gravity of the grasping means; and wherein (i) centerlines of said elongated upper shaft, elongated lower shaft, distal end portion and connecting means are all positioned in a common plane and (ii) the contact means of the lower shaft includes fixation means for fixing the contact means to the fowl or body of meat to prevent movement of the same off the fixation means during lifting and handling.

2. The device of claim 1 wherein the fixation means includes an upwardly directed fixation point.

3. The device of claim 1 wherein the contact means of the lower shaft is elevated from adjacent portions of the lower shaft.

4. The device of claim 1 wherein the contact means of the lower shaft includes a support surface which is in a plane parallel to a plane through the grasping means.

5. The device of claim 1 wherein the distal end portion of the lower shaft is disposed in an upward direction toward a horizontal plane through and beyond a portion of the upper shaft.

6. The device of claim 1 wherein device includes means for stabilizing the fowl or body of meat against rotating about the lower shaft.

7. The device of claim 6 wherein the connecting means includes the stabilizing means.

8. The device of claim 6 wherein the contact means includes the stabilizing means.

9. The device of claim 1 wherein the connecting means is integral with and vertically aligned with the upper and lower shafts.

10. The device of claim 1 wherein the device is substantially U-shaped.

11. The device of claim 1 wherein the contact means is spaced at least 3 inches below the grasping means.

12. The device of claim 1 wherein the lower shaft is at least 3 inches long.

* * * * *